(12) United States Patent
Bray et al.

(10) Patent No.: US 8,587,833 B2
(45) Date of Patent: *Nov. 19, 2013

(54) COLOR JOB REPRINT SET-UP FOR A PRINTING SYSTEM

(75) Inventors: Daniel Bray, Rochester, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/523,309

(22) Filed: Jun. 14, 2012

(65) Prior Publication Data

US 2012/0262744 A1 Oct. 18, 2012

Related U.S. Application Data (62) Division of application No. 11/888,601, filed on Aug. 1, 2007, now Pat. No. 8,203,750.

(51) Int. Cl.
*H04N 1/40* (2006.01)
*G06F 3/012* (2006.01)
*H04N 1/60* (2006.01)

(52) U.S. Cl.
CPC ............... *H04N 1/60* (2013.01); *H04N 1/6055* (2013.01)
USPC ........... 358/1.9; 358/3.23; 358/504; 358/505; 358/518; 358/2.1; 347/19

(58) Field of Classification Search
CPC ............. B41J 2/525; B41J 29/46; G06F 3/12; H04N 1/6055; H04N 1/60
USPC .......... 358/1.9, 2.1, 1.1, 1.11–1.18, 504, 406, 358/3.23, 1.6, 517, 518, 530; 380/54, 55; 382/100, 167

See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Chad Dickerson
(74) *Attorney, Agent, or Firm* — Fay Sharpe LLP (57) ABSTRACT

A printing system is provided for enabling a consistent color job re-print comprising a plurality of image marking engines. The system includes printing a master test image document printed by at least a first image marking engine. The master test image can have a data glyph and a plurality of reference patches. The data glyph can record distinct job attributes and the plurality of reference patches can record color parameters of a desired output. The system further provides a scanner for scanning the master test image document. The data glyph can provide the job attributes of the master test image document and can generate set-up data therefrom. The reference patches can provide the color parameters of the master test image document and can generate set-up data therefrom.

14 Claims, 3 Drawing Sheets

(56) References Cited

U.S. PATENT DOCUMENTS

| | | | |
|---|---|---|---|
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,642,202 A * | 6/1997 | Williams et al. ............. 358/406 |
| 5,710,874 A | 1/1998 | Bergen |
| 5,710,968 A | 1/1998 | Clark et al. |
| 5,778,377 A | 7/1998 | Marlin et al. |
| 5,884,910 A | 3/1999 | Mandel |
| 5,991,469 A | 11/1999 | Johnson |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,654,143 B1 | 11/2003 | Dalal et al. |
| 6,819,906 B1 | 11/2004 | Herrmann et al. |
| 6,925,283 B1 | 8/2005 | Mandel et al. |
| 6,959,165 B2 | 10/2005 | Mandel et al. |
| 6,973,286 B2 | 12/2005 | Mandel et al. |
| 7,014,374 B2 | 3/2006 | Hamaguchi |
| 7,024,152 B2 | 4/2006 | Lofthus et al. |
| 7,123,873 B2 | 10/2006 | deJong et al. |
| 7,162,172 B2 | 1/2007 | Grace et al. |
| 7,188,929 B2 | 3/2007 | Lofthus |
| 7,206,532 B2 | 4/2007 | Lofthus et al. |
| 7,206,536 B2 | 4/2007 | Julien |
| 7,224,913 B2 | 5/2007 | Richards |
| 7,226,049 B2 | 6/2007 | Lofthus et al. |
| 7,226,158 B2 | 6/2007 | Moore et al. |
| 7,245,838 B2 | 7/2007 | Swift |
| 7,245,844 B2 | 7/2007 | de Jong et al. |
| 7,245,856 B2 | 7/2007 | Furst et al. |
| 8,203,750 B2 | 6/2012 | Bray et al. |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0114157 A1 * | 6/2004 | Linder et al. .................. 358/1.9 |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2006/0066885 A1 | 3/2006 | Anderson et al. |
| 2006/0067756 A1 | 3/2006 | Anderson et al. |
| 2006/0067757 A1 | 3/2006 | Anderson et al. |
| 2006/0114313 A1 | 6/2006 | Moore |
| 2006/0114497 A1 | 6/2006 | Anderson et al. |
| 2006/0115287 A1 | 6/2006 | Roof |
| 2006/0115288 A1 | 6/2006 | Roof |
| 2006/0132815 A1 | 6/2006 | Lofthus et al. |
| 2006/0197966 A1 | 9/2006 | Viturro et al. |
| 2006/0209101 A1 | 9/2006 | Mizes |
| 2006/0214359 A1 | 9/2006 | Clark |
| 2006/0214364 A1 | 9/2006 | Clark et al. |
| 2006/0215240 A1 * | 9/2006 | Mongeon .................... 358/504 |
| 2006/0221159 A1 | 10/2006 | Moore et al. |
| 2006/0221362 A1 | 10/2006 | Julien |
| 2006/0222384 A1 | 10/2006 | Moore et al. |
| 2006/0227350 A1 | 10/2006 | Crawford et al. |
| 2006/0230201 A1 | 10/2006 | Fromherz et al. |
| 2006/0230403 A1 | 10/2006 | Crawford et al. |
| 2006/0235547 A1 | 10/2006 | Hindi et al. |
| 2006/0238778 A1 * | 10/2006 | Mongeon et al. .............. 358/1.4 |
| 2006/0244980 A1 * | 11/2006 | Grace ......................... 358/1.9 |
| 2006/0268317 A1 | 11/2006 | Lofthus et al. |
| 2006/0268318 A1 | 11/2006 | Lofthus et al. |
| 2006/0269310 A1 | 11/2006 | German et al. |
| 2006/0274334 A1 | 12/2006 | Mongeon |
| 2006/0274337 A1 | 12/2006 | Dalal et al. |
| 2006/0280517 A1 | 12/2006 | Roof et al. |
| 2006/0285159 A1 | 12/2006 | Frankel |
| 2007/0002085 A1 | 1/2007 | Sampath et al. |
| 2007/0002344 A1 | 1/2007 | Klassen |
| 2007/0002403 A1 | 1/2007 | Klassen |
| 2007/0024894 A1 | 2/2007 | Moore et al. |
| 2007/0031170 A1 | 2/2007 | deJong et al. |
| 2007/0041745 A1 | 2/2007 | Dalal et al. |
| 2007/0052991 A1 | 3/2007 | Goodman et al. |
| 2007/0081064 A1 | 4/2007 | Spencer et al. |
| 2007/0081828 A1 | 4/2007 | Radulski et al. |
| 2007/0110301 A1 | 5/2007 | Wu et al. |
| 2007/0116479 A1 | 5/2007 | Mandel et al. |
| 2007/0120305 A1 | 5/2007 | Mandel et al. |
| 2007/0120933 A1 | 5/2007 | Mueller |
| 2007/0120934 A1 | 5/2007 | Lang |
| 2007/0120935 A1 | 5/2007 | Willis |
| 2007/0122193 A1 | 5/2007 | Carolan |
| 2007/0140711 A1 | 6/2007 | Anderson et al. |
| 2007/0140767 A1 | 6/2007 | Mandel et al. |
| 2007/0145676 A1 | 6/2007 | Biegelsen et al. |

OTHER PUBLICATIONS

Desmond Fretz, "Cluster Printing Solution Announced", Today at Xerox (Tax), No. 1129, Aug. 3, 2001.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.

(56) References Cited

OTHER PUBLICATIONS

U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006 Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.
U.S. Appl. No. 11/787,777, filed Apr. 18, 2007, Costanza et al.
U.S. Appl. No. 11/807,478, filed May 29, 2007, Ruml et al.
U.S. Appl. No. 11/807,472, filed May 29, 2007, Ruml et al.
U.S. Appl. No. 11/807,473, filed May 29, 2007, Binh et al.

* cited by examiner

COLOR JOB REPRINT SET-UP FOR A PRINTING SYSTEM

This application is a divisional application of U.S. pending patent application, Ser. No. 11/888,601, filed Aug. 1, 2007, which is incorporated herein by reference.

BACKGROUND

In a color xerographic printing system that comprises multiple xerographic engines or image marking engines, a problem of color consistency and color matching can arise between individual image marking engines of an integrated system or between the same image marking engine from one print job relative to another subsequent print job. The present disclosure is directed to a method and system for maintaining color consistency and color matching of job reprints from one or more image marking engines and/or between multiple image marking engines. The present disclosure provides an efficient system and method for providing color accuracy and/or color consistency from one print job to another print job utilizing one image marking engine or multiple image marking engines.

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. Pat. No. 7,226,049, Issued Jun. 5, 2007, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. Pat. No. 7,206,532, Issued Apr. 17, 2007, entitled "MULTIPLE OBJECT SOURCES CONTROLLED AND/OR SELECTED BASED ON A COMMON SENSOR," by Robert M. Lofthus, et al.;

U.S. Pat. No. 7,188,929, Issued Mar. 13, 2007, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Pat. No. 7,226,158, Issued Jun. 5, 2007, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BY-PASS PAPER PATH," by Robert A. Clark;

U.S. Publication No. 20031468US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Pat. No. 7,206,536, Issued Apr. 17, 2007, entitled "PRINTING SYSTEM," by Paul C. Julien;

U.S. Publication No. US-2006-0221362-A1, Published Oct. 5, 2006, entitled "PRINTING SYSTEM," by Paul C. Julien;

U.S. Pat. No. 7,245,844, Issued Jul. 17, 2007, entitled "PRINTING SYSTEM," by Jeremy C. deJong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Pat. No. 7,245,856, Issued Jul. 17, 2007, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Pat. No. 7,224,913, Issued May 29, 2007, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Loftus, et al.;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 2006, entitled "WARM-UP OF MULTIPLE INTEGRATED MARKING ENGINES," by Bryan J. Roof, et al.;

U.S. Pat. No. 7,245,838, Issued Jul. 17, 2007, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2006-0291018-A1, Published Dec. 28, 2006, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0002085-A1, Published Jan. 4, 2007 entitled "HIGH AVAILABILITY PRINTING SYSTEMS," by Meera Sampath, et al.;

U.S. Publication No. US-2007-0024894-A1, Published Feb. 1, 2007, entitled "PRINTING SYSTEM," by Steven R. Moore, et al.;

U.S. Publication No. US-2007-0041745-A1, Published Feb. 22, 2007, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. Application Publication No. US-2007-0052991-A1, Published Mar. 8, 2007, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. Publication No. US-2007-0081828-A1, Published Apr. 12, 2007, entitled "PRINTING SYSTEM WITH BALANCED CONSUMABLE USAGE," by Charles Radulski, et al.;

U.S. Publication No. US-2007-0081064-A1, Published Apr. 12, 2007, entitled "MEDIA PATH CROSSOVER FOR PRINTING SYSTEM," by Stan A. Spencer, et al.; and, U.S. Publication No. US-2007-0110301-A1, published May 17, 2007, entitled "GAMUT SELECTION IN MULTI-ENGINE SYSTEMS," by Wencheng Wu, et al.;

U.S. Publication No. US-2007-0116479-A1, published May 24, 2007, entitled "MEDIA PASS THROUGH MODE FOR MULTI-ENGINE SYSTEM," by Barry P. Mandel, et al.;

U.S. Publication 20050363US-NP, Published May 31, 2007, entitled "MULTIPLE IOT PPHOTORECEPTOR BELT SEAM SYNCHRONIZATION," by Kevin M. Carolan;

U.S. Publication No. US-2007-0120935-A1, Published May 31, 2007, entitled "MEDIA PATH CROSSOVER CLEARANCE FOR PRINTING SYSTEM," by Keith L. Willis;

U.S. Publication No. 20051103US-NP, Published May 31, 2007, entitled "PRINTING SYSTEM," by David A. Mueller;

U.S. Publication No. US-2007-0120305-A1, Published May 31, 2007, entitled "RADIAL MERGE MODULE FOR PRINTING SYSTEM," by Barry P. Mandel, et al.;

U.S. Publication No. US-2007-0120934-A1, Published May 31, 2007, entitled "MIXED OUTPUT PRINTING SYSTEM," by Joseph H. Lang;

U.S. Publication No. US-2007-0140767-A1, Published Jun. 21, 2007, entitled "PRINTING SYSTEM ARCHITECTURE WITH CENTER CROSS-OVER AND INTERPOSER BY-PASS PATH," by Barry P. Mandel, et al.;

U.S. Publication No. US-2007-0140711-A1, Published Jun. 21, 2007, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. Publication No. US-2007-0145676-A1, Published Jun. 28, 2007, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd F. Bean, II;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. Publication No. A3190US-NP, Published Feb. 8, 2007, entitled "PRINTING SYSTEM WITH INVERTER DISPOSED FOR MEDIA VELOCITY BUFFERING AND REGISTRATION", by Joannes N. M. Dejong et al.;

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/636,901, filed Dec. 11, 2006, entitled "DATA BINDING IN MULTIPLE MARKING ENGINE PRINTING SYSTEMS BACKGROUND", by Martin E. Banton et al.;

U.S. application Ser. No. 11/636,747, filed Dec. 11, 2006, entitled "METHOD AND SYSTEM FOR IDENTIFYING OPTIMAL MEDIA FOR CALIBRATION AND CONTROL", by Lalit Keshav Mestha et al.;

U.S. application Ser. No. 11/639,073, filed Dec. 14, 2006, entitled "MODULE IDENTIFICATION METHOD AND SYSTEM FOR PATH CONNECTIVITY IN MODULAR SYSTEMS", by David K. Biegelsen et al.;

U.S. application Ser. No. 11/612,908, filed Dec. 19, 2006, entitled "EXCEPTION HANDLING", by Wheller Ruml et al.;

U.S. application Ser. No. 11/642,028, filed Dec. 19, 2006, entitled "BI-DIRECTIONAL MEDIA SHEET TRANSPORT APPARATUS", by James J. Spence et al.;

U.S. application Ser. No. 11/643,119, filed Dec. 21, 2006, entitled "MEDIA FEEDER FEED RATE", by Robert A. Clark et al.;

U.S. application Ser. No. 11/656,992, filed Jan. 23, 2007, entitled "PREEMPTIVE REDIRECTION IN PRINTING SYSTEMS", by Meera Sampath et al.;

U.S. application Ser. No. 11/708,298, filed Feb. 20, 2007, entitled "EFFICIENT CROSS-STREAM PRINTING SYSTEM", by Joseph H. Lang;

U.S. application Ser. No. 11/714,016, filed Mar. 5, 2007, entitled "METHOD OF DUPLEX PRINTING ON SHEET MEDIA", by Michael R. Furst;

U.S. application Ser. No. 11/787,777, filed Apr. 18, 2007, entitled "METHOD OF CONTROLLING AUTOMATIC ELECTROSTATIC MEDIA SHEET PRINTING", by Daniel W. Costanza et al.;

U.S. application Ser. No. 11/796,910, filed Apr. 30, 2007, entitled "SCHEDULING SYSTEM", by Brougham et al.;

U.S. application Ser. No. 11/801,231, filed May 9, 2007, entitled "REGISTRATION METHOD USING SENSED IMAGE MARKS AND DIGITAL REALIGNMENT", by Shen-Ge Wang et al.:

U.S. application Ser. No. 11/807,472, filed May 29, 2007, entitled "SYSTEM AND METHOD FOR ON-LINE PLANNING UTILIZING MULTIPLE PLANNING QUEUES", by Wheeler Ruml et al.;

U.S. application Ser. No. 11/807,473, filed May 29, 2007, entitled "MODEL-BASED PLANNING WITH MULTI-CAPACITY RESOURCES", by Minh Binh et al.;

U.S. application Ser. No. 11/807,475, filed May 29, 2007, entitled "SYSTEM AND METHOD FOR REAL-TIME SYSTEM CONTROL USING PRECOMPUTED PLANS", by Wheeler Ruml et al.;

U.S. application Ser. No. 11/807,478, filed May 29, 2007, entitled "MODEL-BASED PLANNING USING QUERY-BASED COMPONENT EXECUTABLE INSTRUCTIONS", by Wheeler Ruml et al.;

U.S. application Ser. No. 11/890,084, filed Aug. 1, 2007, entitled "COLOR JOB OUTPUT MATCHING FOR A PRINTING SYSTEM", by Daniel M. Bray.

BRIEF SUMMARY

A printing system is provided for enabling a consistent color job re-print comprising a plurality of image marking engines. The system includes printing a master test image document printed by at least a first image marking engine. The master test image can have a data glyph and a plurality of reference patches. The data glyph can record distinct job attributes and the plurality of reference patches can record color parameters of a desired output. The system further provides a scanner for scanning the master test image document. The data glyph can provide the job attributes of the master test image document and can generate set-up data therefrom. The reference patches can provide the color parameters of the master test image document and can generate set-up data therefrom. The data glyph and the reference patches of the scanned image data are compared with retrieved prestored image data for generating compensation values based on a difference between the scanned image set-up data and the prestored image data for at least a first subsequent image document on the same first image marking engine or a second image marking engine.

The present disclosure further provides for a printing system enabling a consistent color job re-print. The system includes a first image marking engine and at least a second image marking engine. A first color calibration image document is printed by the first image marking engine and a second color calibration image document is printed by the at least second image marking engine. The first and second color calibration prints are scanned by a calibrated color spectrophotometer and corrected for adherence to operating set points. The calibrated first and second image marking engines are each corrected and an initial quick set print comprising a first job is outputted from each of the first and second image marking engines. Each quick set print includes a series of color reference patches and an encoded data glyph comprising job attributes for reference therefrom.

Further in accordance with the present disclosure, a method is provided for color job re-printing in a printing system. The method comprises printing a master test image document from a first image marking engine including a data glyph and a plurality of reference patches in association with the master test image. The data glyph records distinct job attributes and the reference patches records color values of the master test image document. The method further comprises scanning the master test image document and reading the data glyph and the reference patches of the master test image document corresponding to a first job for generating set-up data from the data glyph and the reference patches. The set-up data includes information for calibrating and updating color correction tables and actual set-up targets for at least a first subsequent image document to be printed on the same first image marking engine or a second image marking engine.

BRIEF DESCRIPTION OF THE DRAWINGS

The following is a brief description of each drawing used to describe the present disclosure, and thus, are being presented for illustrative purposes only and should not be limitative of the scope of the present disclosure, wherein.

DETAILED DESCRIPTION OF THE EXEMPLARY EMBODIMENTS

In many areas of copier/printer/scanner image quality testing, it is desirable to start with a known test or master, process it through the machine under test, and analyze the resulting image. Based on the results of this analysis, the machine under test, can be adjusted, calibrated, or compensated via various control points. For example, if a halftone pattern is being reproduced on a laser printer, the resulting reflectance of the electronically generated halftone can change from printer to printer or overtime for the same printer. If the output from a printer is digitized via a scanner, the printer's response to an applied halftone can be measured and compensated for by modifying parameters within the halftoning process such as the tonal reproduction curve. Thus, by applying a known input, and measuring the error between the desired output and the actual output, a matrix of correction terms can be derived to obtain the desired output from the machine.

Figure 1:
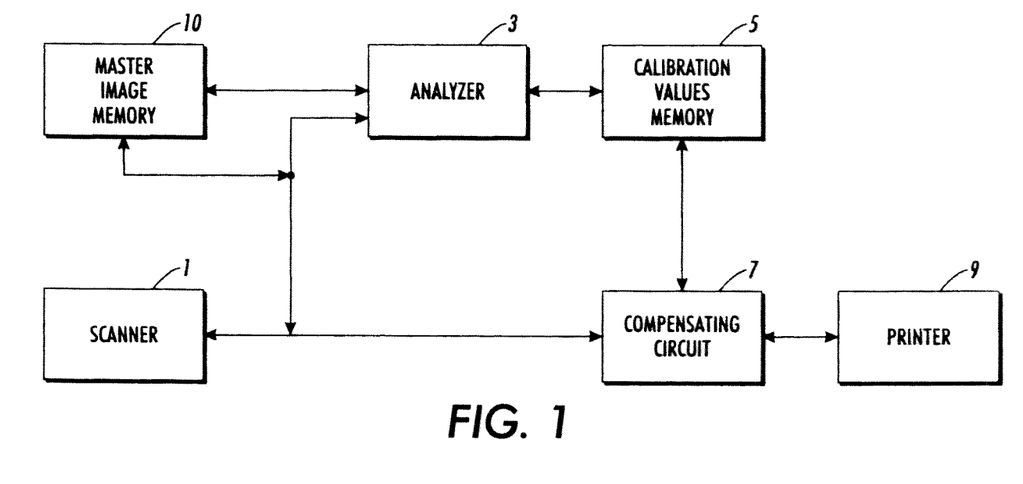
FIG. 1 shows a block diagram illustrating a conventional calibration system.

FIG. 1 illustrates a conventional system used to calibrate a monochrome printer. A scanner 1 scans in a master or target image having a predetermined set of test patches. This master image is stored in a master image memory 10. When calibrating the printer, the stored master image is fed to a printer 9 via a compensating circuit 7 which allows the master image to pass therethrough without processing. The printer 9 prints the master image on a recording medium which is fed back into the scanner 1. The scanned in image is fed to an analyzer 3 which compares the image data values of the scanned in image with the master image data values fed from the master image memory 10. The analyzer 3 determines the errors or differences between the two images and produces calibration values therefrom which are stored as a new screen matrix in a calibration values memory 5. The calibration values are used by compensating circuit 7 to correct image data subsequently sent to the printer 9 so that the image is reproduced accurately.

The calibration technique described with respect to FIG. 1 can also be extended to calibrate color printers. However, due to the increase number of output attributes, calibration in the color domain is more complex. In addition, the calibration technique can be extended to line width/growth image quality diagnostics, photoreceptor deletions, etc.

First, the color scanner itself needs to be properly calibrated since most scanners are not colorimetric. The conventional scanner calibration is done by scanning a color test pattern with the scanner. The scanner R, G, B readings are then correlated with the CIE/XYZ values of reference patches measured with a colorimeter. Grey patches in the test pattern can be used to establish the relationship between the scanner R, G, and B values and the luminance intensity L. The L equivalent scanned R, G, and B values are then multiplied by a 3×3 matrix to yield the X, Y, and Z values. The matrix of correction coefficients are determined by regression analysis to minimize the difference between the measured and calculated X, Y, and Z values. With the scanner calibrated, the device dependent scanner R, G, and B values can then be related to the device independent standard measures, such as the CIE/XYZ values.

Once the scanner is calibrated, the printer is calibrated. There are several methods of performing color printer output calibrations, such calibrations can be classified as algorithmic, table look-up, or a hybrid approach.

In calibrating the color printer, conventionally, a printed test image is scanned by a calibrated scanner. A resulting 24 bit image in LAB space (30 bits in RGB space) is then analyzed (ten bits per RGB color scan), and the average scan patch RGB values are determined and converted to device independent data. The device independent data can then be processed to convert the data into $L^*C^*h^*$ space. Interpolated RGB levels corresponding to a minimum chroma can then be the basis of a set of grey balance screens or a set of new seed RGB values for a new test pattern generation, if further iteration is required.

The second step in the conventional color calibration is to determine the color correction matrix or matrices that will enable a match between the input and output colors. Initially, color seed data is utilized to print multiple 3×9 matrices of color patches. The colors in each matrix correspond to all the possible combinations of increasing and decreasing RGB values by a fixed amount around a center value targeted towards a selected set of colors. The pattern is then printed on the color printer to be calibrated.

The printed patterns are then scanned with the scanner RGB values of the patches being converted to the CIE/$L^*a^*b^*$ and the color difference between the printed patches and the corresponding test target are computed. The RGB values of the patch with the minimum color difference are then used as color seed data in the next iteration. Upon obtaining a set of modified RGB values that have a small enough color difference, a multiple linear regression analysis is performed to determine the matrix needed to transform the input RGB to the modified RGB. One way of conventionally transforming the input to the modified RGB is utilizing a process which weights each term by the sum of the squares of partial differentials of $L^*$, $a^*$, and $b^*$ with respect to R, G, and B values evaluated at the target RGB points. Once the transformation is established between the input RGB to the modified RGB, these values can be utilized to calibrate the color printer.

In a color xerographic printer that employs multiple xerographic engines or multiple image marking engines, the problem of color consistency and color matching between engines can be addressed by placing a scanner in the output path and printing "calibration" prints on each engine. The calibration prints can then be used to correct or match each engines output. In a single engine printing system, a similar process is used to obtain color accuracy or meet a specific customer expectation. In both systems, the problem of print engine variability over time can lead to repeated "set-ups" when a job reprint is desired.

Figure 2:
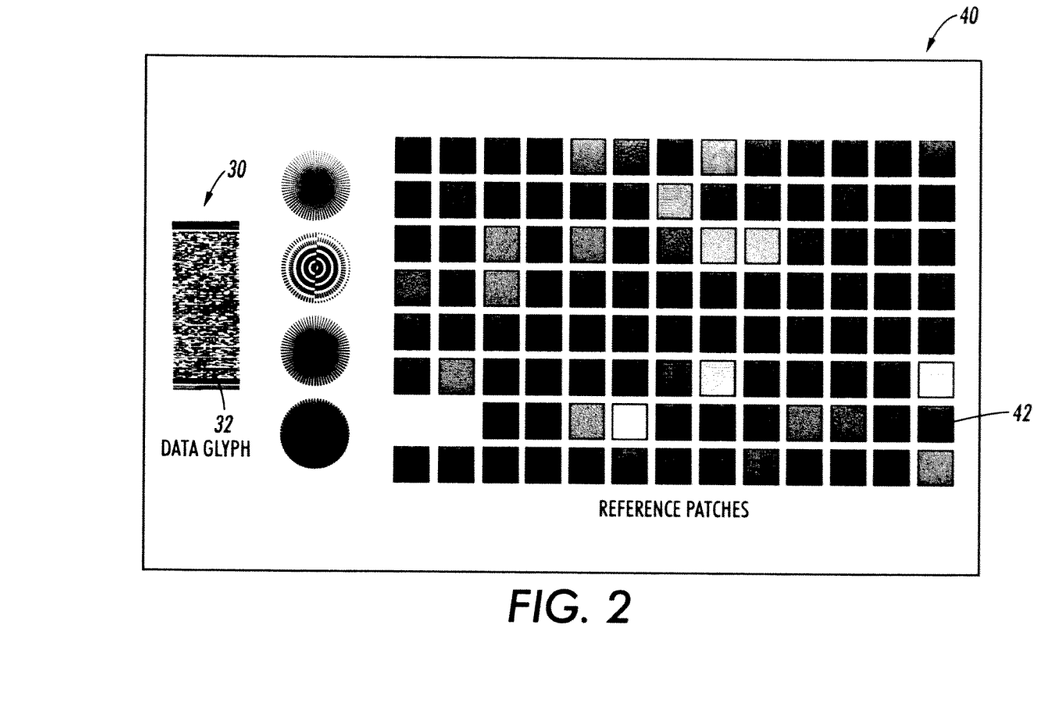
FIG. 2 shows an example of a master test image displaying a data glyph and a series of reference patches; and, FIG. 3 shows a plurality of master test images displaying data glyphs and reference patches for a plurality of image marking engines, respectively.

To facilitate subsequent job reprints, and more particularly, efficient and consistent job reprints, the following is provided. Once the print system is set-up and producing acceptable output, the operator can request a job "quick set" print that would be kept for future reprints. When a job reprint is desired, the "quick set" reference print would be scanned. The reference print would provide all the information needed to allow the print system to converge on the previous color values, image settings, and other job attributes necessary to quickly complete the reprint request. This "quick set" print can contain color reference patches, and a data glyph on a single side of one page (FIG. 2). The reference patches provide information to calculate and update the color correction tables and actual set-up targets. The data glyph contains xerographic, image path, and other important settings.

Figure 3:
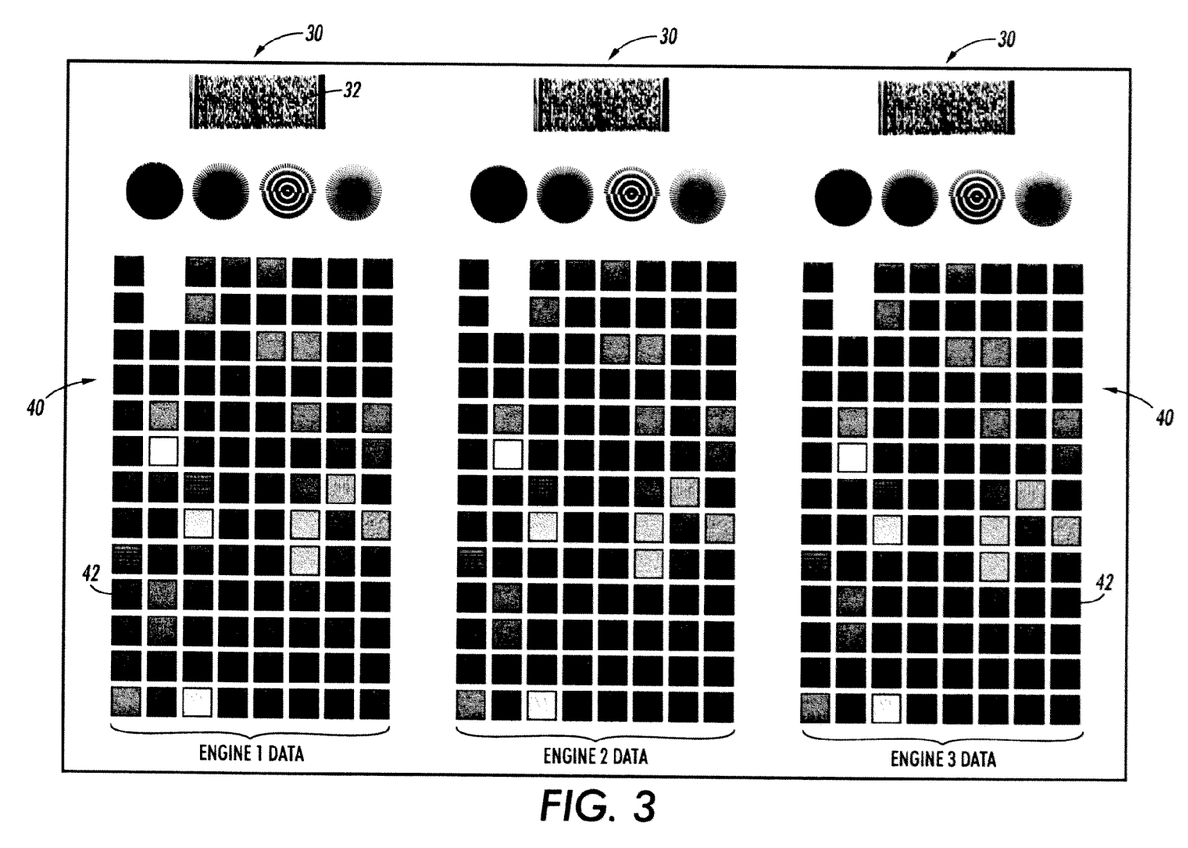

The "quick set" prints can be adapted for an integrated printing system or rack mounted printing system by printing a data glyph and reference patch set for each image marking engine in the system (FIG. 3). In an integrated parallel printing system, multiple image marking engines can be present within the system. These devices operate in parallel to produce the required output job stream. Controlling the color output of each engine so that the system output appears uniform and equal is a difficult problem. One proposed solution is to have each engine in the system generate a color calibration print that would be scanned. The scanned image would be processed and adjustments would be made to the engine. This process is repeated until all engines are within a predetermined window of acceptability. A similar process can be used to calibrate a single engine printing system as well. This can be done by printing a set of reference patches which are then scanned by a calibrated color spectrophotometer and corrections are made to operating set points based on the result. It is proposed here that once the print system is adjusted to produce acceptable output, the operator or customer could print a special sheet that would contain a data glyph 30 and a reference patch set 40 for each image marking engine in the system. This special sheet or 'quick set' print contains actual patches 42 the machine would use as target values, and encoded data 32 in a glyph 30. The data glyph 30 contains image settings, xerographic settings, rendering options, transfer/media related adjustments and other job attributes. This 'quick set' print would be saved and scanned at a later date to speed the set-up process for job reprints or similar jobs using the same or similar media.

The system can further provide a calibration means for comparing scanned image data with the retrieved prestored image data and for generating compensation values based on a difference between the scanned image data and the prestored image data.

The scanned image data is compared with the retrieved prestored image data to generate compensation values based on a difference between the scanned image data and the prestored image data.

In one illustrative embodiment, data glyphs 30 can be two dimensional bar codes that can encode digital information, as described in U.S. Pat. No. 5,991,469, the disclosure of which is totally incorporated herein by reference. However, it should be appreciated that bar codes or any other techniques for encoding data can be used in other embodiments as well.

The data glyphs can include image settings, xerographic settings, rendering options, image path settings, transfer/media related adjustments, and other job attributes. Data glyphs can be utilized because they possess error resistant qualities and are amenable to being used in scanners or facsimiles without losing the capability of storing encoded data that can still be interpreted by e-mail/fax server after being transmitted. Moreover, data glyphs 30 also retain their error resistant qualities after repeated scans or facsimile transmissions. Thus, a given data glyph can be reused and sent to any number of destinations for communication of job attributes of a "quick set" print. The "quick set" print would be saved and scanned at a later date to speed the set-up process for job reprints or similar jobs using the same or similar media.

In one exemplary embodiment, the scanner detects which job attributes have been used by the quick set print, it interprets the corresponding data glyph 30 to determine the type of job attributes that were used in the quick set print and applies same to the job attributes of the same or other image marking engines for subsequent prints. In this manner, the subsequent prints are consistent with the prints that occurred at the time of the "quick set" print(s).

When calibrating the printer, the stored master image or quick set print, is fed to a printer 9 via a compensating circuit 7 which allows the master image to pass therethrough without processing.

The scanned master image is also fed to an analyzer 3 which compares the image data values of the scanned image with compensated master image data values fed from the master mage memory 10. The master mage data is compensated by a transformation circuit which adjusts the master image data so that the master image data can be compared with corresponding scanned data.

The analyzer 3 determines the errors or differences between the two associated images and produces calibration values therefrom which are stored as a screen matrix or matrices in a calibration values memory 5. The calibration values are used by compensating circuit 7 to correct image data subsequently sent to the printer 9 so that the image is reproduced accurately.

The calibration process utilized by the present disclosure may be any conventional calibration process. For example, in a digital reprographic system that reproduces either continuous tone, or half-tone pictorials, a digital screen or digital screening method is utilized to convert the monochrome multi-level image into a monochrome bi-level image targeted for a specific printer. Digital screens can be specified by two independent functions; a dot growth pattern and a threshold level array. The dot growth pattern defines a shape of each halftone dot and how that dot will be filled. The total number of positions within each dot determines the maximum number of the unique grey levels which can be reproduced (N+1). Typically, a digital reprographic system will have many dot growth patterns, error diffusion, and spot overlap tables which are optimized for different types of pictorials.

The threshold level array, of size N, defines the bi-level decision values for each position in the dot growth pattern. By substituting a threshold level array element into the dot growth pattern having the same index, an unique screen matrix is formed. Thus, by adjusting the values of the threshold level array, brightness, contrast, and detail of the pictorial reproduced on the printer can be changed independent of the dot growth pattern. Due to this independence, the values for the threshold level array, which on a target printer result in a linear change in reflectance, can be quantized to N+1 levels.

Given a specific dot growth pattern, a calibration print can be generated which contains patches. Each patch is an area filled with multiple, adjacent copies of the dot pattern at a specific stage in the growth sequence. Since N+1 grey levels can be represented using a dot growth pattern of size N, N+1 patches are generated on a calibration print; one for each possible grey level. Once printed, each patch exhibits a reflectance value which can be measured. Thus, the set of N+1 patches represent all the possible reflectance values which can be printed on the target printer for a specific dot growth pattern.

By setting each element in the threshold level array to the measured reflectance of the corresponding patch, a screen matrix, which is linear in reflectance, can be obtained for a specific printer and dot growth pattern. Thus, the process to generate linear reflectance screens for a given dot growth pattern and printer can be summarized as the generating of a bi-level calibration print with patches for each stage of the dot growth sequence; printing the calibration print on the target printer; measuring the reflectance of each patch on the calibration print; setting the value of each element of the threshold level array to the corresponding patch reflectance; and building a new screen matrix from the original dot growth pattern and the new threshold level array.

Utilizing the calibration process described above, a semi-automatic procedure can be utilized to calibrate digital reprographic systems. Since it is typical for an image scanner to be used in the capture of pictorials, it is possible to use the same scanner for the patch reflectance measurement step described above. This is accomplished by scanning the calibration print from the target printer and numerically averaging the patch areas to determine the resulting reflectance of each patch. Moreover, the test patches may be wheels to provide more calibration information per test sheet. For example, a color wheel will allow calibration of hue and saturation at a specific luminance. On the hand, the wheel may be for grey balance calibration wherein offset from neutral and intensity can be calibrated.

The data glyph 30 or other type of machine-readable encoded data can be placed on the master image to uniquely identify each quick set image. This encoded data can contain information, such as time, date, machine serial number, master image name, master image serial number, etc., which can be used by the analysis program.

The present disclosure has been described with test patches; however, the calibration sheet may contain any test object, such as grey patches, color patches, color wheels, grey balance wheels, line growth patterns, dot growth patterns, sweeps for grey balance, etc. The present disclosure is not limited merely test patches, but is applicable to any printed object which assists in the calibration, diagnosis, or testing of a printer.

While the disclosure has been described in conjunction with the specific embodiments described above, it is evident that many alternatives, modifications and variations are apparent to those skilled in the art. In particular, although the above discussion of the disclosure is with respect to fuser rolls or fixing members for electrostatographic printing processes, the disclosure can be applied to any type of member having an elastomer coating over a supporting substrate. Accordingly, the preferred embodiments of the disclosure as set forth above are intended to be illustrative and not limiting. Various changes can be made without departing from the spirit and scope of the disclosure.

The invention claimed is:

1. A system for color job re-print in a printing system, comprising:
    a plurality of image marking engines sharing a common output destination integrated into the printing system;
    a master test image document printed by a plurality of image marking engines, said master test image document having a plurality of data glyphs and a plurality of reference patches printed on one side of a sheet by the plurality of image marking engines that operate in parallel, wherein each image marking engine produces a data glyph and a plurality of reference patches;
    said data glyph recording distinct job attributes and said plurality of reference patches recording color parameters of a desired output pertaining to a specific image marking engine;
    a scanner for scanning said master test image document;
    said data glyphs providing said job attributes on said master test image document and for generating set-up data therefrom;
    said reference patches providing said color parameters of said master test image document and for generating set-up data therefrom;
    wherein said data glyphs and said reference patches of scanned image data of said master test image document are compared with retrieved prestored image data for generating compensation values based on a difference between said scanned image data of said master test image and the prestored image data for at least a first subsequent image document on same said first image marking engine and a second image marking engine;
    wherein said at least a first subsequent image document is a reprint of at least a portion of a job: and,
    said set-up data provided from the reference patches includes information for calibrating color correction tables and color set-up targets and said set-up data provided from the data glyphs includes information for configuring job attributes for application to said reprint of at least a portion of said job using said first image marking engine and said second image marking engine such that said first image marking engine and said second image marking engine selectively reprint at least a portion of said job.

2. The system as claimed in claim 1, wherein said set-up data is provided to said first image marking engine or said second image marking engine for matching said at least a first subsequent image document from said first image marking engine or said second image marking engine to said master test image document of said first image marking engine.

3. The system as claimed in claim 2, wherein said set-up data is provided to at least a third image marking engine.

4. The system as claimed in claim 1, wherein said set-up data is provided to said second image marking engine and a third image marking engine for matching said at least a first subsequent image document from said second image marking engine or said third image marking engine to said master test image document of said first image marking engine.

5. The system as claimed in claim 1, wherein said set-up data is provided to said second image marking engine and a third image marking engine for matching said at least a first subsequent image document from said second image marking engine and at least a second subsequent image document from said second image marking engine or said third image marking engine to said master test image document Of said first image marking engine.

6. The system of claim 5, wherein said set-up data includes information for calculating and updating color correction tables and actual set-up targets for at least a second subsequent image document; and,
    said at least a first subsequent image document printed from said second image marking engine and said at least a second subsequent image document printed from said third image marking engine.

7. The system of claim 6, wherein said job attributes are selected from a group consisting of image settings, xerographic settings, rendering options, transfer related adjustments, and media adjustments.

8. A method for color job re-print in a printing system, comprising:
    printing a master test image document from a plurality of image marking engines, said master test image document having a plurality of data glyphs and a plurality of reference patches printed on one side of a sheet by the plurality of image marking engines that operate in parallel, wherein each image marking engine produces a data glyph and a plurality of reference patches;
    said data glyph recording distinct job attributes and said reference patches recording color values of said master test image document pertaining to a specific image marking engine;
    scanning said master test image document;
    reading said data glyphs and said reference patches of said master test image document;
    comparing scanned image data of said master test image document with the retrieved prestored image data from at least said first image marking engine and said second image marking engine for generating compensation values based on a difference between said scanned image data of said master test image document and said prestored image data for at least a first subsequent image document to be printed on same said first image marking engine and a second image marking engine;
    wherein said at least a first subsequent image document is a reprint of at least a portion of a job: and,
    generating set-up data from said data glyph and said reference patches, said set-up data provided from the reference patches includes information for calibrating and updating color correction tables and actual set-up targets and said set-up data provided from the data glyphs includes information for configuring job attributes for application to said reprint of at least a portion of said job using said first image marking engine and said second image marking engine; and said first image marking engine and said second image marking engine selectively reprint at least a portion of said job.

9. The method of claim 8, further comprising:

providing said set-up data to at least said first image marking engine or said second image marking engine for matching said at least a first subsequent image document from said first image marking engine or said second image marking engine to said master test image document of said first image marking engine.

10. The method of claim 9, further comprising:

providing said set-up data to at least a third image marking engine for matching said at least a first subsequent image document from said third image marking engine to said master test image document of said first image marking engine.

11. The method of claim 10, wherein said at least a first subsequent image document is a job reprint of said first job.

12. The method of claim 10, wherein said at least a first subsequent image document is a reprint of a portion of said first job.

13. The method of claim 8, further comprising:

comparing scanned image data of said master test image document with retrieved prestored image data from at least said second image marking engine and a third image marking engine for generating compensation values based on a difference between said scanned image data of said master test image document and said prestored image data; and, providing said set-up data to at least said second image marking engine or said third image marking engine for matching said at least a first subsequent image document from said second image marking engine or said third image marking engine to said master test image document of said first image marking engine.

14. The system of claim 13, wherein said job attributes are selected from a group consisting of image settings, xerographic settings, rendering options, transfer related adjustments, and media adjustments.

* * * * *